(12) United States Patent
Yang et al.

(10) Patent No.: US 9,286,835 B2
(45) Date of Patent: Mar. 15, 2016

(54) DRIVING CIRCUIT AND DRIVING METHOD FOR LIGHT EMITTING DIODE AND DISPLAY APPARATUS USING THE SAME

(75) Inventors: Xiang Yang, Shenzhen (CN); Fei Li, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 13/380,883

(22) PCT Filed: Dec. 16, 2011

(86) PCT No.: PCT/CN2011/084125
§ 371 (c)(1),
(2), (4) Date: Oct. 22, 2014

(87) PCT Pub. No.: WO2013/086737
PCT Pub. Date: Jun. 20, 2013

(65) Prior Publication Data
US 2015/0054859 A1    Feb. 26, 2015

(30) Foreign Application Priority Data

Dec. 14, 2011 (CN) .......................... 2011 1 0418212

(51) Int. Cl.
*G09G 3/34* (2006.01)
*H05B 33/08* (2006.01)
*G09G 3/36* (2006.01)

(52) U.S. Cl.
CPC ............ *G09G 3/3406* (2013.01); *G09G 3/3648* (2013.01); *H05B 33/0818* (2013.01); *G09G 2320/062* (2013.01); *G09G 2320/0626* (2013.01); *Y02B 20/346* (2013.01)

(58) Field of Classification Search
None
See application file for complete search history.

(56) References Cited

U.S. PATENT DOCUMENTS

| 8,339,067 B2 * | 12/2012 | Lin et al. ........................ 315/291 |
| 2012/0153856 A1 * | 6/2012 | Liu et al. ........................ 315/219 |
| 2012/0286686 A1 * | 11/2012 | Watanabe et al. ............. 315/224 |

* cited by examiner

Primary Examiner — Kenneth B Lee, Jr.

(57) ABSTRACT

The present invention provides a driving circuit and a driving method for light-emitting diodes (LEDs), and a display apparatus using the same. The driving circuit comprises a power switch and a dimmer circuit. The method comprising: providing a pulse width modulation (PWM) dimming signal and a high frequency dimming signal; and multiplying the PWM dimming signal and the high frequency dimming signal for providing a driving signal to the power switch. The present invention can improve a dimming effect of the LEDs.

10 Claims, 3 Drawing Sheets

DRIVING CIRCUIT AND DRIVING METHOD FOR LIGHT EMITTING DIODE AND DISPLAY APPARATUS USING THE SAME

FIELD OF THE INVENTION

The present invention relates to a driving circuit and a driving method for light-emitting diodes (LEDs), and more particularly to a driving circuit and a driving method for LEDs applicable to a backlight module and a display apparatus.

BACKGROUND OF THE INVENTION

Liquid crystal displays (LCDs) have been widely applied in electrical products. Currently, most of LCDs are backlight type LCDs which comprise a liquid crystal panel and a backlight module. According to the position of the backlight source, the backlight module can be a side-light type or a direct-light type in order to provide LCDs with backlight.

Light emitting diodes (LEDs) have several beneficial characteristics, including low electrical power consumption, low heat generation, long operational life, small volume, good impact resistance, fast response and excellent stability for emitting color light with stable wavelengths. These characteristics have made the LEDs suitable for light sources of the backlight module.

Currently, in an LED driving circuit, a pulse width modulation (PWM) dimming signal is utilized to control a current switch of the LEDs for dimming the light of the LEDs.

However, the dimming signal is a low frequency PWM signal, and thus the light of the LEDs can not be dimmed frequently during a specific dimming period, deteriorating the dimming effect of the LEDs As a result, it is necessary to provide a driving circuit and a driving method for the LEDs, and a display apparatus using the same to solve the problems existing in the conventional technologies, as described above.

SUMMARY OF THE INVENTION

The present invention provides a driving circuit and a driving method for LEDs, and a display apparatus using the same, so as to solve the dimming problem using a low frequency PWM signal.

A primary object of the present invention is to provide a driving circuit for driving a plurality of light-emitting diodes, and the driving circuit comprises: a power switch connected to the light-emitting diodes; a resist connected to the power switch and electrically connected to ground; and a dimmer circuit connected to the power switch, wherein the dimmer circuit comprises a multiplier configured to multiply a PWM dimming signal and a high frequency dimming signal, so as to provide a driving signal to the power switch, and the high frequency dimming signal is obtained by transforming an image signal of a display panel.

In one embodiment of the present invention, the power switch is an n-channel metal-oxide-semiconductor (NMOS) transistor.

In one embodiment of the present invention, a drain electrode of the power switch is connected to the LEDs, and a source electrode of the power switch is electrically connected to the resist, and a gate electrode of the power switch is connected to the dimmer circuit.

In one embodiment of the present invention, the high frequency dimming signal is provided by a timing controller.

In one embodiment of the present invention, the high frequency dimming signal is a PWM signal with high frequency.

A further object of the present invention is to provide a driving method for driving a plurality of light-emitting diodes, wherein the light-emitting diodes are electrically connected to a power switch, and the driving method comprises: providing a PWM dimming signal; providing a high frequency dimming signal, wherein the high frequency dimming signal is obtained by transforming an image signal of a display panel; and multiplying the PWM dimming signal and the high frequency dimming signal for providing a driving signal to the power switch.

In one embodiment of the present invention, the high frequency dimming signal is provided by a timing controller.

In one embodiment of the present invention, the high frequency dimming signal is a PWM signal with high frequency.

In one embodiment of the present invention, the PWM dimming signal and the high frequency dimming signal are multiplied by a multiplier of a dimmer circuit.

Another object of the present invention is to provide a display apparatus, and the display apparatus comprises: a display panel; a timing controller; and a backlight module comprising: a back bezel; a plurality of light-emitting diodes disposed on the back bezel; and a driving circuit electrically connected to the light-emitting diodes for driving the light-emitting diodes, wherein the driving circuit comprises: a power switch connected to the light-emitting diodes; a resist connected to the power switch and electrically connected to ground; and a dimmer circuit connected to the power switch, wherein the dimmer circuit comprises a multiplier configured to multiply a PWM dimming signal and a high frequency dimming signal provided by the timing controller, so as to provide a driving signal to the power switch, and the high frequency dimming signal is obtained by transforming an image signal of a display panel.

The driving circuit and the driving method of the present invention can dim the light of the LEDs for many times in a short dimming period, so as to improve the dimming effect of the LEDs and the contrast of the display panel, thus improving the display quality of the display apparatus.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
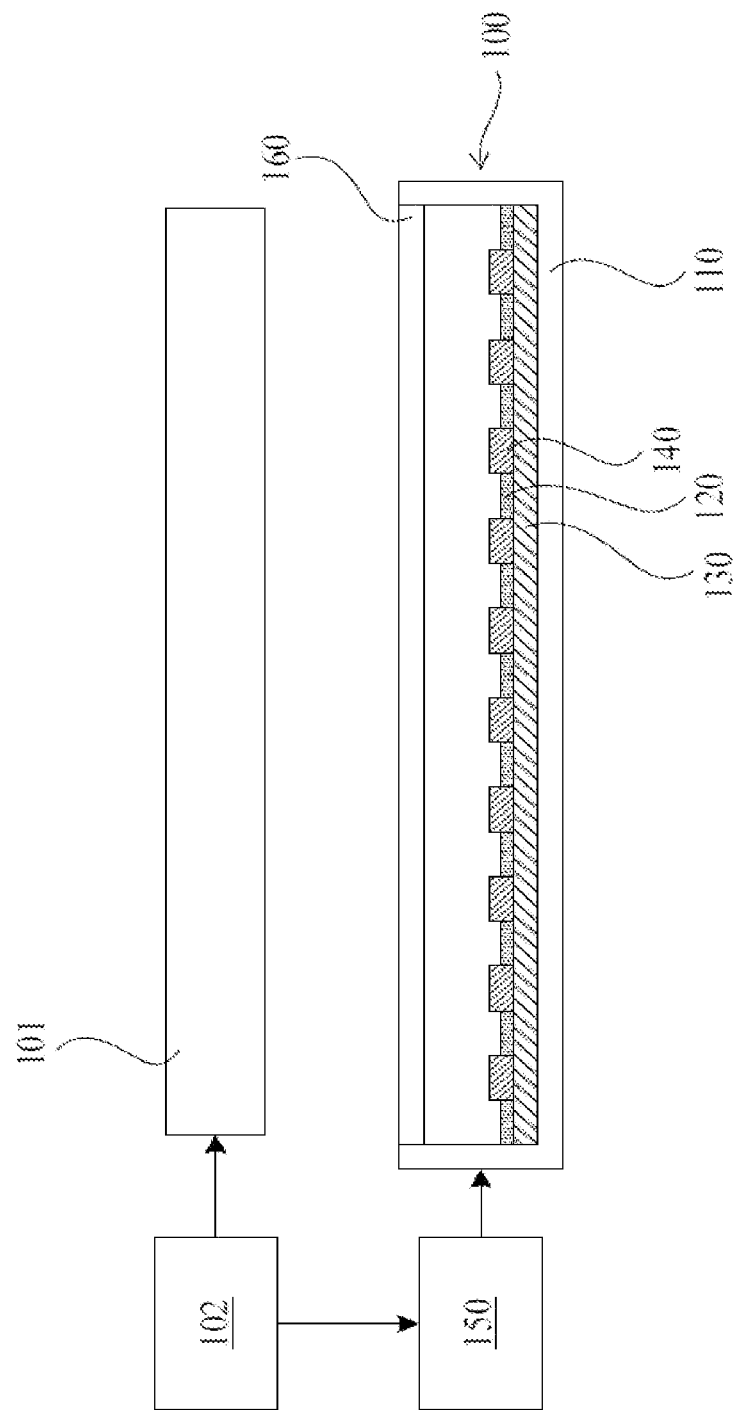
FIG. 1 is a cross-sectional view showing a backlight module and a display panel according to a first embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Referring to FIG. 1, a cross-sectional view showing a backlight module and a display panel according to a first embodiment of the present invention is illustrated. The driving circuit 150 of the present invention is used for driving a plurality of LEDs 120. The LEDs 120 can be connected in series as at least one LED strip, so as to act as a light source of the backlight module 100. The backlight module 100 may be realized as a side-light type backlight module or a direct-light type backlight module disposed opposite to a display panel 101 (such as an LCD panel), thereby forming a display apparatus (such an LCD apparatus). The display apparatus of the this embodiment further comprises timing controller (Tcon) 102 for providing an image signal to the display panel 101, and providing a corresponding backlight driving signal to the backlight module 100.

Referring to FIG. 1 again, in this embodiment, the backlight module 100 may be the direct-light type backlight module which comprises a back bezel 110, the plurality of LEDs 120, a circuit board 130, a reflective layer 140, the driving circuit 150 and at least one optical film 160. The back bezel 110 is configured to carry the LEDs 120 and the circuit board 130. The LEDs 120 can be disposed on the circuit board 130 and electrically connected to the driving circuit 150 through the circuit board 130 for emitting light to the display panel 101. The circuit board 130 may be a printed circuit board (PCB) or a flexible printed circuit (FPC). The reflective layer 140 is formed around the LEDs 120 (such as formed on the circuit board 130 or the back bezel 110) for reflecting the light of the LEDs 120. The driving circuit 150 is electrically connected to LEDs 120 by the circuit board 130. The optical film 160 is disposed above the LEDs 120 for improving the light uniformity and light efficiency thereof.

Figure 2:
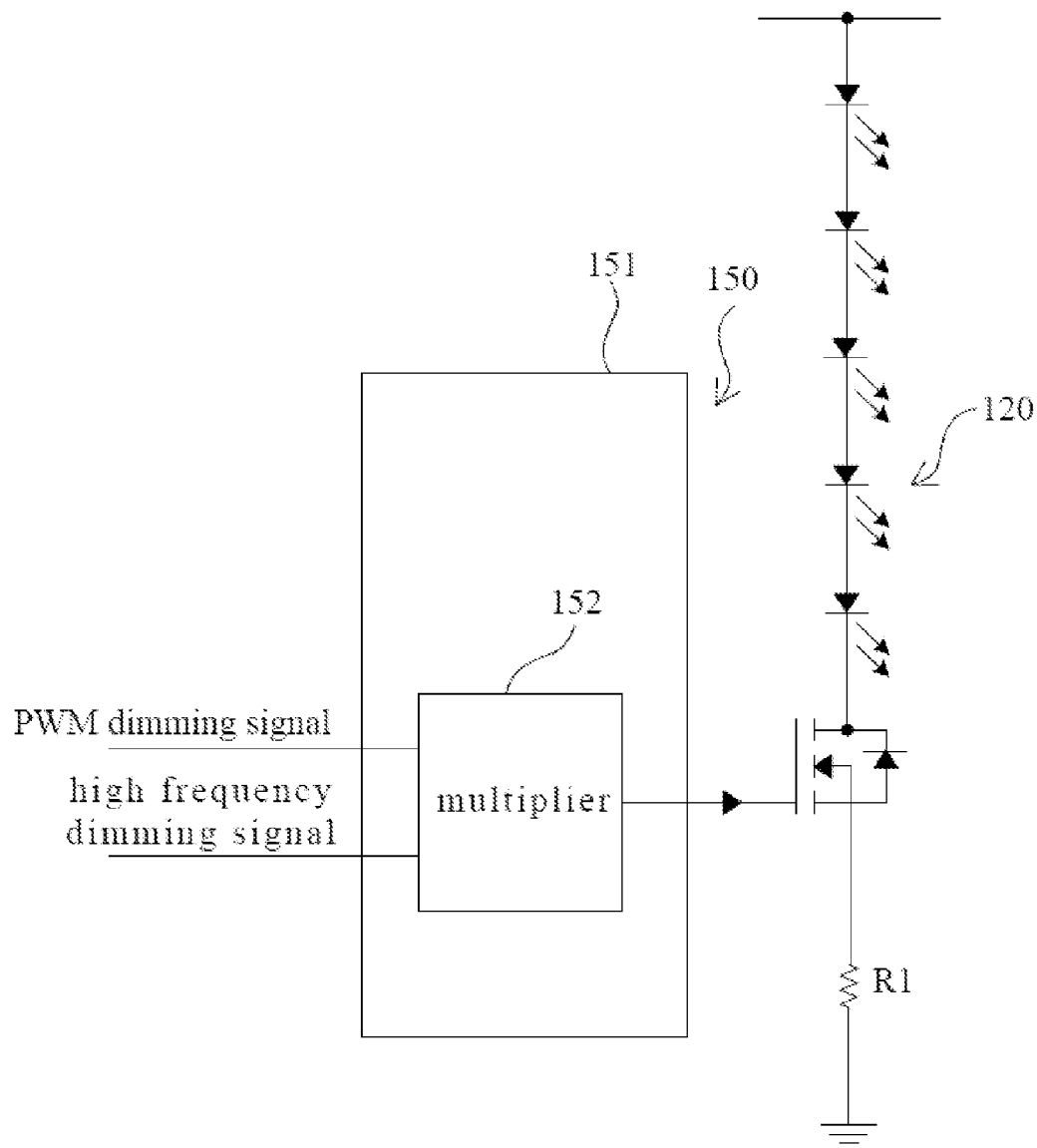
FIG. 2 is a circuit diagram showing the driving circuit according to the first embodiment of the present invention.

Referring to FIG. 2, a circuit diagram showing the driving circuit according to the first embodiment of the present invention is illustrated. The driving circuit 150 of the present embodiment comprises a power switch Q1, a resist R1 and a dimmer circuit 151. The power switch Q1 is connected between the LEDs 120 and the resist R1. The dimmer circuit 151 is connected to the power switch Q1 for transmitting a driving signal to the power switch Q1, so as to dim the light of the LEDs 120. In this case, the dimmer circuit 151 can be integrated into an IC chip.

In this embodiment, the power switch Q1 may be an enhancement mode n-channel metal-oxide-semiconductor (NMOS) transistor, and a drain electrode thereof is connected to the LEDs 120, and a source electrode thereof is electrically connected to the resist R1, and a gate electrode thereof is connected to the dimmer circuit 151.

Referring to FIG. 2 again, the dimmer circuit 151 of this embodiment is connected to the timing controller 102 and the power switch Q1. The dimmer circuit 151 comprises a multiplier 152, and the multiplier 152 is connected to the power switch Q1 for receiving a PWM dimming signal and a high frequency dimming signal. The PWM dimming signal is provided by an external system (not shown), and is transmitted to the dimmer circuit 151 by the timing controller 102. In general, the PWM dimming signal is a low frequency PWM signal. The high frequency dimming signal is provided by the timing controller 102, and the high frequency dimming signal is obtained by transforming an image signal of a display panel 101, wherein a frequency of the high frequency dimming signal is higher than a frequency of the PWM dimming signal which is transmitted from the external system. For example, the frequency of the high frequency dimming signal may be two times or more than three times the PWM dimming signal. The multiplier 152 of the dimmer circuit 151 can multiply the PWM dimming signal and the high frequency dimming signal which are transmitted from the timing controller 102, so as to form the multiplied driving signal. Therefore, the dimmer circuit 151 can provide the multiplied driving signal to act as a driving waveform of the power switch Q1.

When dimming the light of the LEDs 120, the system (not shown) can transmit the PWM dimming signal to the timing controller 102, and the PWM dimming signal can be provided to the driving circuit 150 by the timing controller 102. At the same time, corresponding to different frames (such as a dark frame or a bright frame) of the display panel 101, the timing controller 102 can transform the image signal of the display panel 101 into the high frequency dimming signal (the PWM signal with high frequency) and provide the high frequency dimming signal to the dimmer circuit 151 of the driving circuit 150, so as to allow the multiplier 152 of the dimmer circuit 151 to multiply the PWM dimming signal and the high frequency dimming signal which are transmitted from the timing controller 102. Therefore, a high-frequency PWM dimming signal can be superimposed on the PWM dimming signal with low frequency which is provided by the external system, and the driving signal with the high-frequency PWM dimming signal is provided to the power switch Q1 of the driving circuit 150, so as to control the power switch Q1 for dimming the light of the LEDs 120.

Figure 3:
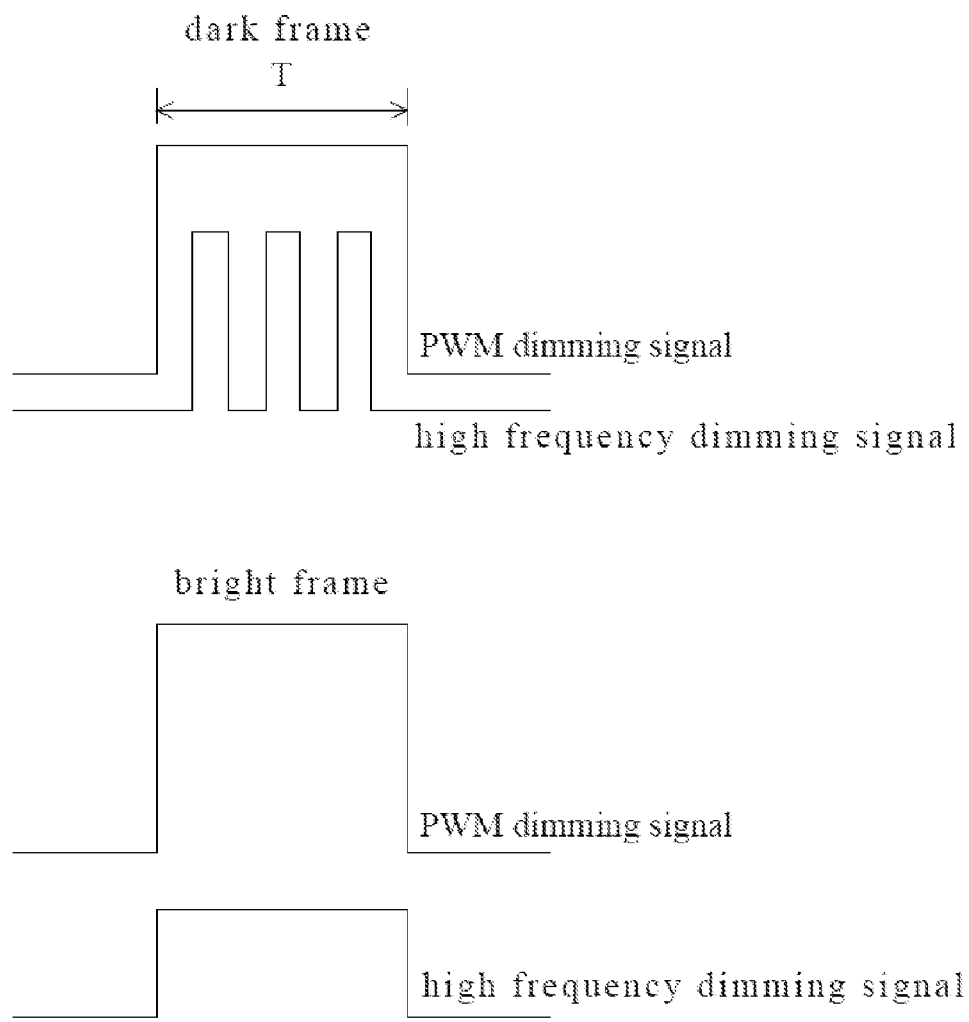
FIG. 3 is a diagram showing waveforms of a PWM dimming signal and a high frequency dimming signal according to the present invention.

Referring to FIG. 3, a diagram showing the waveforms of the PWM dimming signal and the high frequency dimming signal according to the present invention is illustrated. In comparison with the PWM dimming signal and the high frequency dimming signal corresponding to the bright frame, when the display panel 101 displays a dark frame or a frame with low-brightness, the PWM dimming signal with low frequency merely turn on the power switch Q1 once during a short dimming period. At this time, since the multiplier 152 of the dimmer circuit 151 can superimpose the high frequency dimming signal on the PWM dimming signal for providing the driving signal. Therefore, the dimmer circuit 151 of the driving circuit 150 can dim the light of the LEDs 120 for many times during the short dimming period.

Therefore, with the use of the LED driving circuit and method of the this embodiment, in the short dimming period, the LEDs 120 can be dimmed for many times, so as to improve the dimming effect of the LEDs 120 and facilitate a contrast of the display panel 101 for improving a display quality of the display apparatus.

In this embodiment, the driving circuit can be also applicable to a side-light type backlight module. At this time, the backlight module may comprise a back bezel, a plurality of LEDs, a circuit board, a reflective layer, the driving circuit, at least one optical film and a light guide plate. The light guide plate is disposed on the back bezel. The LEDs are disposed on the circuit board to form a light bar which can be disposed at one side of the light guide plate to emit light thereto, and the light is guided to be outputted by the light guide plate. The driving circuit is electrically connected to LEDs by the circuit board for driving the LEDs.

As described above, in comparison the conventional dimming method using the low frequency PWM signal, the circuit and method for driving the LEDs of the present invention can multiply the PWM dimming signal and the high frequency dimming signal. Therefore, with the use of the LED driving circuit and method of the present invention, the LEDs 120 can be dimmed for many times, so as to improve the dimming effect of the LEDs and the contrast of the display panel, thus improving the display quality of the display apparatus.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A driving circuit for driving a plurality of light-emitting diodes (LEDs), comprising:
   a power switch connected to the light-emitting diodes;
   a resist connected to the power switch and electrically connected to ground; and
   a dimmer circuit connected to the power switch, wherein the dimmer circuit comprises a multiplier configured to multiply a pulse width modulation (PWM) dimming signal and a high frequency dimming signal, so as to provide a driving signal to the power switch, and the high frequency dimming signal is obtained by transforming an image signal of a display panel;
   wherein the power switch is a transistor, and a drain electrode of the power switch is connected to the LEDs, and a source electrode of the power switch is electrically connected to the resist, and a gate electrode of the power switch is connected to the dimmer circuit;
   wherein a frequency of the high frequency dimming signal is two times higher than a frequency of the PWM dimming signal.

2. The driving circuit according to claim 1, wherein the power switch is an n-channel metal-oxide-semiconductor (NMOS) transistor.

3. The driving circuit according to claim 1, wherein the high frequency dimming signal is provided by a timing controller.

4. The driving circuit according to claim 1, wherein the high frequency dimming signal is a PWM signal with high frequency.

5. A driving method for driving a plurality of light-emitting diodes, wherein the light-emitting diodes are electrically connected to a power switch, and the driving method comprises:
   providing a PWM dimming signal;
   providing a high frequency dimming signal, wherein the high frequency dimming signal is obtained by transforming an image signal of a display panel; and
   multiplying the PWM dimming signal and the high frequency dimming signal for providing a driving signal to the power switch;
   wherein the PWM dimming signal and the high frequency dimming signal are multiplied by a multiplier of a dimmer circuit;
   wherein the power switch is a transistor, and a drain electrode of the power switch is connected to the LEDs, and a source electrode of the power switch is electrically connected to a resist, and a gate electrode of the power switch is connected to the dimmer circuit;
   wherein a frequency of the high frequency dimming signal is two times higher than a frequency of the PWM dimming signal.

6. The driving method according to claim 5, wherein the high frequency dimming signal is provided by a timing controller.

7. The driving method according to claim 5, wherein the high frequency dimming signal is a PWM signal with high frequency.

8. A display apparatus, comprising:
   a display panel;
   a timing controller; and
   a backlight module comprising:
      a back bezel;
      a plurality of light-emitting diodes disposed on the back bezel; and
      a driving circuit electrically connected to the light-emitting diodes for driving the light-emitting diodes, wherein the driving circuit comprises:
         a power switch connected to the light-emitting diodes;
         a resist connected to the power switch and electrically connected to ground; and
         a dimmer circuit connected to the power switch, wherein the dimmer circuit comprises a multiplier configured to multiply a PWM dimming signal and a high frequency dimming signal provided by the timing controller, so as to provide a driving signal to the power switch, and the high frequency dimming signal is obtained by transforming an image signal of a display panel;
   wherein the power switch is a transistor, and a drain electrode of the power switch is connected to the LEDs, and a source electrode of the power switch is electrically connected to the resist, and a gate electrode of the power switch is connected to the dimmer circuit;
   wherein a frequency of the high frequency dimming signal is two times higher than a frequency of the PWM dimming signal.

9. The display apparatus according to claim 8, wherein the power switch is an NMOS transistor.

10. The display apparatus according to claim 8, wherein the high frequency dimming signal is a PWM signal with high frequency.

* * * * *